Feb. 23, 1932. W. W. POTTER 1,846,142
SPINDLE BEARINGS FOR MACHINE TOOLS
Filed Oct. 14, 1927
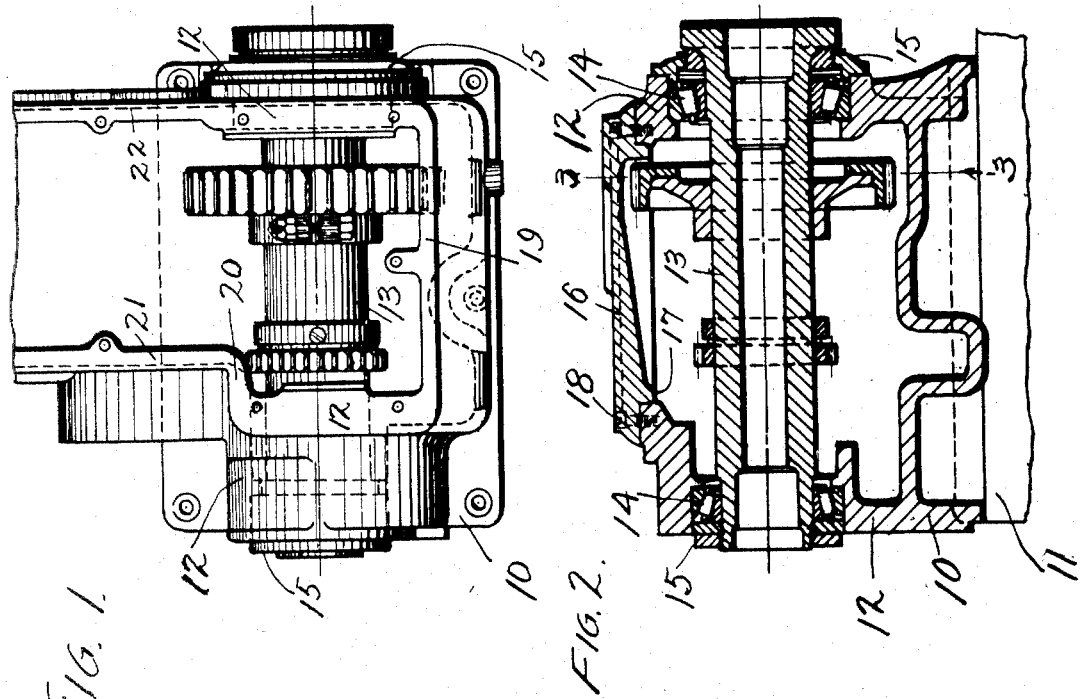
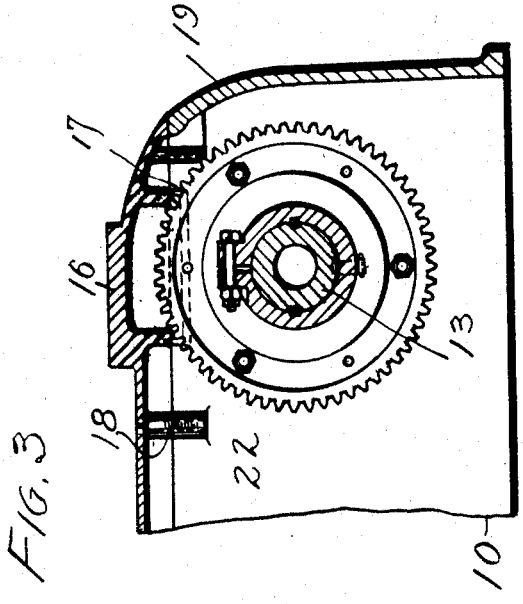
INVENTOR.
W. W. Potter
BY Chas. J. Williamson,
ATTORNEY.

Patented Feb. 23, 1932

1,846,142

UNITED STATES PATENT OFFICE

WILLIAM WALLACE POTTER, OF PAWTUCKET, RHODE ISLAND

SPINDLE BEARINGS FOR MACHINE TOOLS

Application filed October 14, 1927. Serial No. 226,247.

My invention relates to machine tools of the type which have a chuck-carrying spindle which is mounted in anti-friction bearings located at or near its opposite ends. The object of my invention, broadly stated, is to provide a support for the spindle which will reduce to the minimum the possibility of lateral movement under the thrust or pressure of the cutting tool on the work in the chuck, and thus eliminate chattering. An important factor in the problem presented for solution is the anti-friction bearings, and a feature of my invention is the matter of the anti-friction bearing construction.

My invention consists in whatever is described by or is included within the terms or scope of the appended claims.

In the drawings:

Fig. 1 is a top plan view of the headstock or work spindle portion of a machine tool embodying my invention, the brace-forming cover member being removed;

Fig. 2 is a vertical longitudinal section through the spindle axis with the brace-cover in position;

Fig. 3 is a cross section on the line 3—3 of Fig. 2.

What is shown in the drawings is an embodiment of my invention in a machine tool of the automatic turret type, although only the headstock portion of the machine is shown, since it is with that portion of the machine that my invention is concerned. The headstock, 10, is a casting mounted on the top of the base frame, 11, and the headstock includes two vertical arms, 12, spaced apart something less than the length of the chuck carrying spindle, 13, and providing near each end of the spindle a bearing therefor. Each bearing is an anti-friction bearing and each is a single row roller bearing, 14, the rollers being tapering and the smaller ends of the rollers of the two rows being opposite one another, and each roller bearing is secured in place within the opening provided therefor in the respective arm, 12, by means of screw rings or nuts, 15, the two nuts or rings when screwed to position moved towards one another, and thus the bearings are placed in compression and the spindle, 13, placed under lateral constraint, and by thrusting open the arms, 12, tending to press them towards one another. The outer race of the roller bearings in each case is in a recess or opening that has an inwardly projecting shoulder that is engaged by the inner end of said race. Between the two arms, 12, above the spindle is placed a plate, 16, which constitutes a brace for said arms, the inner opposite edges of which are engaged by flanges, 17, on the plate which project downward, and the plate projects over the tops of said arms and is secured thereto by screws or bolts, 18. It will be seen that from the conjoint effect of the compression in the spindle and the bracing action of the plate, 16, the spindle is supported in its bearings with very great rigidity and movements of the headstock portion which supports the spindle and which would result in chatterings are stoutly opposed.

At one side of the spindle the two vertical arms, 12, are tied together by a web, 19, integral therewith, and thus a further element of stiffness or rigidity is imparted to the spindle-supporting structure, and another element of strength is imparted at the opposite side of the spindle by an integral internal jog, 20, which extends parallel with the web, 19, and from which outwardly extends a web, 21, parallel with a web, 22, that extends from the other vertical arm, 12, these webs, 21 and 22, providing bearings or supports for shafts of the machine which extend parallel with the spindle, and which for stiffness and strength should have their bearings as close together as possible, and that condition is secured by the inward jog, 20. It will be seen that in plan view as shown in Fig. 1, the headstock is substantially U-shape.

The plate, 16, constitutes a cover for the opening in the top of the headstock lying between the webs, 19, 21 and 22.

A feature of my invention is the single row roller bearing for the spindle, which in itself is a desirable form of anti-friction bearing.

What I claim is:

1. A machine tool having a work-spindle, a headstock having spaced apart arms with anti-friction bearings for the spindle, means to place the bearings in compression on the spindle and exert inward pressure upon said arms, and a brace interposed between said arms.

2. A machine tool having a work-spindle, a headstock having spaced apart arms with anti-friction bearings for the spindle, means to place the bearings in compression on the spindle and exert inward pressure upon said arms, and a brace interposed between said arms, comprising a plate having flanges projecting between the arms and engaging them.

3. A machine tool having a work-spindle, a headstock having spaced apart arms with anti-friction bearings for the spindle, means to place the bearings in compression on the spindle and exert inward pressure upon said arms, a brace interposed between said arms, and a tie between said arms integral therewith.

4. A machine tool having a work-spindle, a headstock having spaced apart arms with anti-friction bearings for the spindle, means to place the bearings in compression on the spindle and exert inward pressure upon said arms, a brace interposed between said arms, a tie between said arms integral therewith, at one side of the spindle, a jog extending inwardly from the opposite side of one of said arms integral with the arm and from which extends a web at right angles to the spindle, and a similar web extending from the other arm.

5. A machine tool having a work-spindle, a headstock having spaced apart arms with single row roller anti-friction bearings for the spindle, means to place the bearings in compression on the spindle and exert inward pressure upon said arms, and a brace interposed between said arms.

6. A machine tool having a work spindle, separated bearings therefor, each bearing containing single row roller anti-friction bearings, the rollers being tapering, and the smaller ends of the rollers of the two rows being opposite.

In testimony whereof I hereunto affix my signature.

WILLIAM WALLACE POTTER.